United States Patent [19]

Barbour et al.

[11] 3,984,817

[45] Oct. 5, 1976

[54] DATA PROCESSING SYSTEM HAVING IMPROVED PROGRAM ALLOCATION AND SEARCH TECHNIQUE

[75] Inventors: Kenneth R. Barbour, Burlington, Mass.; Christopher M. McCulloch, Old Windsor, England

[73] Assignee: Honeywell Information Systems, Inc., Waltham, Mass.

[22] Filed: Oct. 20, 1975

[21] Appl. No.: 623,849

Related U.S. Application Data

[63] Continuation of Ser. No. 414,063, Nov. 8, 1973, abandoned.

[52] U.S. Cl. .................................................. 340/172.5
[51] Int. Cl.² ........................................... G06F 9/20
[58] Field of Search ..................... 340/172.5; 445/1

[56] References Cited
UNITED STATES PATENTS

| | | | |
|---|---|---|---|
| 3,275,991 | 9/1966 | Schneberger | 340/172.5 |
| 3,333,252 | 7/1967 | Shimabukuro | 340/172.5 |
| 3,412,382 | 11/1968 | Couleur et al. | 340/172.5 |
| 3,602,895 | 8/1971 | Loizides | 340/172.5 |
| 3,602,901 | 8/1971 | Jen | 340/172.5 |
| 3,614,745 | 10/1971 | Podvin et al. | 340/172.5 |
| 3,614,746 | 10/1971 | Klinkhamer | 340/172.5 |
| 3,675,214 | 7/1972 | Ellis et al. | 340/172.5 |
| 3,742,460 | 6/1973 | England | 340/172.5 |

*Primary Examiner*—Harvey E. Springborn
*Attorney, Agent, or Firm*—John S. Solakian; Ronald T. Reiling

[57] ABSTRACT

Resources in a data processing system's memory are allocated to a plurality of programs based upon their activity level. The least active programs in the system have their memory space deallocated in favor of new programs which are required during the operation of the system. Each use of a program, whether it be a new program or one which has been used before and is still in the system's memory, causes the activity queue of the used program to be given the highest activity state and further, the activity queues, including queue and link pointers, of the programs next more recently used and next less recently used and the just used program have their activity queues updated. For increased speed in searching for and thereby finding a particular program in response to a received instruction, the programs are linked in families which are depicted by common and significant information bits. A mask is utilized to segregate from the received instruction, the common information bits, in order to address an entry in a search table by means of a start point table. The start point table includes a plurality of addresses for directly addressing the first entry in the search table of each of the many families of entries. The entries in such addresses in the start point table are constantly updated to address the most recently used entry (i.e. program) in each of the families of entries. The entries in the search table include the pointers for both the activity queues and the linking entries in the family of entries as well as a pointer to a location in memory which stores the particular program corresponding to the entry.

23 Claims, 7 Drawing Figures

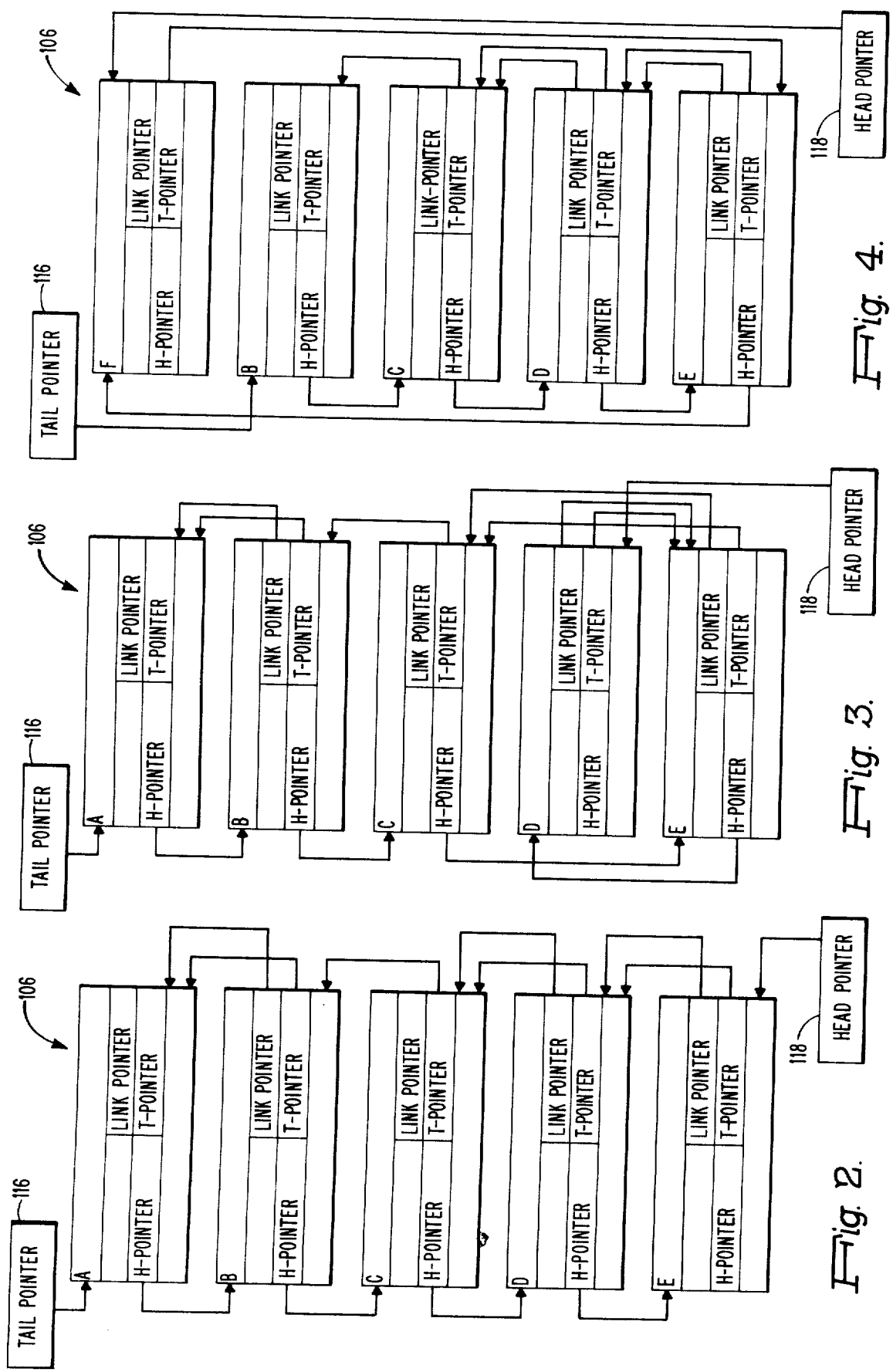

DATA PROCESSING SYSTEM HAVING IMPROVED PROGRAM ALLOCATION AND SEARCH TECHNIQUE

This is a continuation of application Ser. No. 414,063, filed Nov. 8, 1973, and now abandoned.

BACKGROUND OF THE INVENTION

The present invention relates to data processing systems and more particularly to means for allocating memory resources for programs and for locating such programs in a timely manner.

In data processing systems, it is often necessary to duplicate the operations of older data processing systems by what is called the emulation process. The older, or emulated data processing system, may include several hundred instructions, which in the older data processing system, would function as instructed. If such received instruction designed for use in the older data processing system is to be utilized by a new data processing system, it is usually necessary to provide an instruction or group of instructions, i.e. a program or routine so as to execute in the new data processing system in the same manner as the old data processing system.

These programs associated with such received instructions, are usually stored in the system's memory. One manner of locating these programs is to simply link the received instruction to an address of the corresponding program in the memory. However, it is not always possible to store all of the programs in memory because of generally a lack or restriction on memory resource capacity. Thus, only a certain number of programs may be stored in the memory.

One manner of solving this problem might be to store some of the programs in a secondary storage media, such as a disk. However, it has been found that the time it takes to fetch a program from a disk is generally longer than the time it would take to actually generate or build a program in accordance with the requirements of the received instruction.

Thus, as indicated hereinabove, the allocation of memory resources to various programs must be considered and in addition the speed of access to these programs in response to a received instruction must also be considered as for example where such programs are associated with input and output operations between the data processing system and peripheral devices associated therewith, where transfer of data at extremely high speeds is required.

It is accordingly an object of the invention to provide an improved technique for allocating space for programs in a computer's memory in order to effectively utilize such memory space.

It is a further object of the invention to provide such improved system which includes a technique for not only efficiently allocating memory resources but to also efficiently and in a speedy manner search for and locate a particular program associated with the received instruction.

The invention accordingly comprises the features of construction, combination of elements and arrangement of parts exemplified in an embodiment hereinafter set forth and the scope of the invention is indicated in the claims.

SUMMARY OF THE INVENTION

The allocation and search technique of the data processing system of the present invention utilizes a memory in which a plurality of programs are stored, a search table which includes a plurality of entries equal in number to the number of programs in the memory, and in addition a start point table to address certain ones of the entries in the search table. Each entry in the search table comprises, for specifically identifying the entry to be the one corresponding to the received instruction, a pointer pointing to the address of the associated program in the memory, a link pointer pointing to another entry in the search table which is in the same family of entries as the particular entry, an H-pointer to the more recently used entry in the search table and a T-pointer to the less recently used entry in the search table. The significant bits address one of the locations in the start point table, which location includes an address of an entry in the search table. Upon receipt of an instruction, the start point table is addressed and it in turn addresses an entry in the search table. If a hit is made, that is if the search argument in the entry compares with the instruction received, then the particular program in memory is addressed by means of the P-pointer for that entry. If there is no hit, then the search is continued until there is a hit, after which as may be appropriate, the H and T-pointers are updated and also the link pointer is updated. If there is no hit after a full search, a new program is built and a corresponding entry is entered in the search table with corresponding updated in the various pointers.

BRIEF DESCRIPTION OF THE DRAWINGS

For a fuller understanding of the nature and objects of the invention, reference should be made to the following detailed description taken in conjunction with the accompanying drawings wherein:

FIG. 2 is an operational flow diagram showing the initial state of a group of entries in the search table of the invention;

FIG. 3 is an operational flow diagram of a group of entries in the search table of the present invention showing the linkage of the pointers in the entries of the search table after one of such entries has had its corresponding program addressed;

FIG. 4 is an operational flow diagram of a group of entries in the search table of the present invention showing the state of the various pointers after a new entry has been inserted in the search table;

DETAILED DESCRIPTION OF THE PREFERRED EMBODIMENTS

Figure 1:
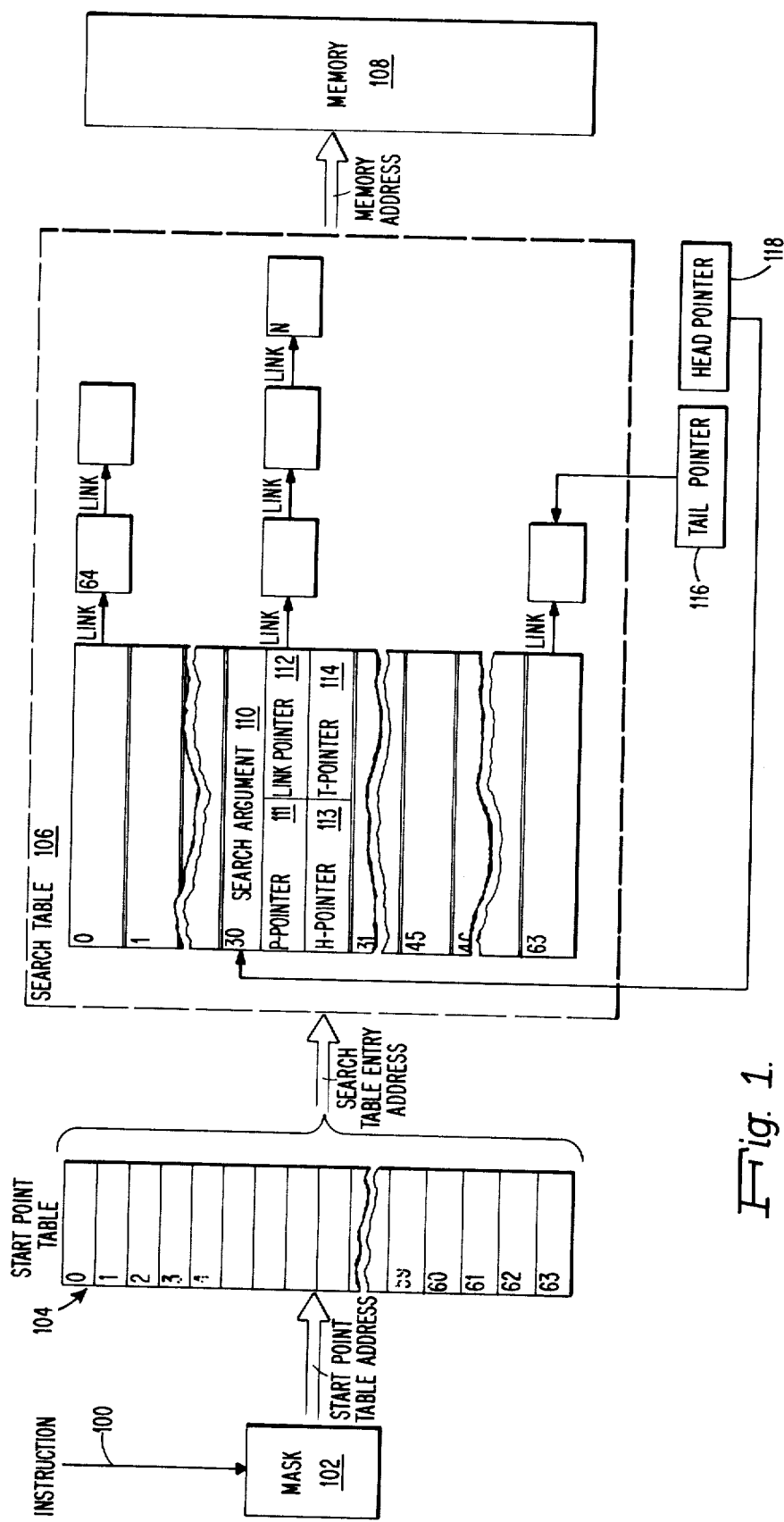
FIG. 1 is a general block diagram of the system of the present invention.

With reference to FIG. 1, there is shown a block diagram representation of the system of the present invention. The system is coupled to receive an instruction on line 100. This instruction may also be one which is to be executed by the system of the present invention by means of one or more instructions, i.e. a program, which may be stored in the memory 108. More particularly, the instruction received on line 100 may be one designed for another data processing sysem and the associated program in memory 108 may be that which is required to emulate the instructed operation on the present system. Accordingly, in response to an instruction on line 100, a particular program is addressed in memory 108. Since there are many programs which must be utilized to emulate the different instruction which may be received on line 100, and since in most cases it is not practical to place such programs in, for example, a disk memory, and further since storage locations in a read/write core or semiconductor memory such as memory 108 is usually limited and must be allocated to various operations, it is then imperative that such memory resources be allocated within the requirements of the system and that in addition, time, between the receipt of an instruction on line 100 and the addressing of an associated program in memory 108, must be minimized to the extent possible.

As indicated hereinbefore, there are many different types of instructions which may be received on line 100. By the system of the present invention, the significant bits as hereinafter described, of such instructions are received by a start point table 104 by means of a mask 102. The start point table 104 may include a plurality of locations equal in number to the power of the number of significant bits. For example, mask 102 may pass six significant bits, thereby providing a six bit address to start point table 104 and thus allowing a total of sixty-four locations in table 104 to be addressed. Each of the locations in start point table 104 includes an address which is utilized to address an entry, as hereinafter described, in search table 106. Each entry in search table 106 includes a plurality of parameters, five of which are of interest here.

As indicated hereinbefore, because of the limited resources in memory 108, such memory space must be utilized as expediciously as possible. Accordingly, by a scheme of queueing the entries in search table 106 so that the most recently used entry and least recently used entry are at opposite ends of the queue, then the least recently used entries and therefore their associated program are substituted for by newly built programs and the queues are updated accordingly. In this manner, the more often used programs have their entries at the high or head end of the queue in the search table and are available without going through the building process for a new program. For less often used programs, their associated entries in the search table 106 may be bumped and replaced by entries corresponding to new programs which may be required during the operation of the system. In addition, and as indicated hereinbefore, the addresses received by start point table 104, include the significant bits of the instruction received on line 100. These significant bits may address any one of a plurality of entries in search table 106. Each of such plurality of entries addressable by table 104 may in turn address other entries in their same family of entries. Thus, entries in the search table 106 which are linked together by link pointers are said to be in a family of entries and each one of such entries in a family may be addressable directly by table 104 depending upon which entry in the family is the most recently active. More particularly, the significant bits passed by mask 102 are those bits which would distinguish in most cases one instruction from another. Thus, in a, for example 32 bit instruction, as received on line 100, it may be found for example that in most cases the bit pattern in the significant bits, which may be in various bit locations in the instruction, would generally distinguish one instruction over another. Accordingly, with six significant bits, then 64 different entries in search table 106 may be directly addressed by means of start point table 104. Thus, depending upon the location of a particular entry in table 106, it may be directly addressed by table 104 or in the alternative may be addressed by linking to the entry which is directly addressable by a start point table 104.

Thus, mask 102 accepts an instruction on line 100 and passes only the significant bits in order to address table 104. The addressed location in table 104 includes an address which in turn is used to address an entry in table 106 here shown as entries 0 through 63 corresponding to the locations 0 through 63 in start point table 104. It should be understood that the address locations in table 106 need not have a number correspondance to the locations in table 104. For example, the address in location 2 of table 104 may address an entry at address 75 in table 106. Each one of the entries specifically depicted, namely entries 0, 30, 45 and 63 may point to no additional entries in sequence, a plurality of entries. For example, entry 0 is shown to be linked to two additional entries in the same family whereas entries 30 and 63 are linked to three and one additional entry respectively. Entry 45 on the other hand, does not include any linkage and accordingly its family comprises only itself as an entry. As shown in search table 106, there can be up to N entries as shown by the last entry of the family of entries associated with the entry whose address is 30.

Each entry in search table 106 includes at least five parameters as shown for the entry whose address is 30. These five parameters include the search argument 110, the pointer 11, the link pointer 112, the H-pointer 113 and the T-pointer 114. The search argument 110 includes an instruction which may be identical to the instruction received on line 100 and is utilized for purposes of indicating whether or not there is a comparison or hit between the instruction received and the entry addressed in table 106. If there is a hit, then the P-pointer 111 addresses the program in memory 108. The link pointer 112 is included in each of the entries and points to the next entry in the family wherein the next entry has not been used as recently as the entry which may be initially addressed by table 104. The last entry in a family of entries has a link pointer of binary zeros thereby designating that this is the last entry or the least recently used entry in the family. The H-pointer 113 points to the next more recently used entry in the total number of entries in the search table 106 regardless of the family in which such entries may reside. Accordingly, if the entry in table 106 whose address is 30 was more recently used than the entry whose address is 45, then the H-pointer 113 of entry 45 would point to entry 30. Similarly, the T-pointer points to the next less recently used entry, that is the one which was used just before this entry. Thus in the example, the T-pointer of entry 30 points to entry 45. Further, most recently used entry of all the entries in table 106 is pointed to be a Head pointer 118. Similarly, the Tail pointer 116 points to the entry which has had the least recent use of all the entries in table 106. As shown in FIG. 1, the Head pointer 118 points to entry 30 and the Tail pointer 116 points to the second entry in the family of entries whose initial entry has an address 63.

Each time that there is a hit of an entry in search table 106, the Head and as may be required the Tail pointer are updated. In addition the H-pointer 113 and T-pointer 114 are updated for the entry which has been hit and that immediately preceding, that is the next less recently used entry, and the immediately succeeding, that is next more recently used entry. Accordingly, only three entries in the search table have their pointers updated when an entry and therefore a program is used. It should be understood that such entries are updated upon the commencement of such use, and that while a program is still being executed, i.e. used, it is entirely possible for that program's activity queue in its entry to change in status when the use of other programs is commenced. Thus, in this manner, the less recently used entries are placed at the bottom of the queue and the more recently at the top of the queue and accordingly should there not be a hit in the search table 106 thereby indicating that a new program must be built for use in connection with the instruction received on line 100, then the least recently used entry as pointed to by Tail pointer 116, is replaced by the entry of the new program. Further, if there is not a hit on an entry in table 106 on the first try, that is, if the addresses of start point table 104 do not point directly to the addresses which are indicated to be the entries whose addresses are 0 through 63 in table 106, then the link pointers must be updated for the associated entries which were effected. Thus, if there is a hit on an entry immediately or directly from an address in table 104, there is no need to change the link pointer. If, however, there is not an immediate hit on an entry in the search table 106, then the link pointer for the entry hit and for the entry immediately preceeding it, must have their link pointers updated. In this manner, and for example if the entry that is hit is the entry whose address is 64 which is immediately linked from the entry whose address is 0, in such case the entry 64 would change places with the entry 0. That is, entry 64 would be directly addressable by table 104 and its link pointer would point to entry 0, whereas entry 0 would have its link pointer point to the entry formerly linked from entry 64, which in this case is the last entry in the family. Accordingly, depending on the instruction received on line 100, entry 64 would be the first hit and entry 64 would point to the entry 0 which then points to the last entry in the family. In this manner, the time to match the instruction with an entry in the table 106 is minimized since the technique will let the more recently used entry in the family of entries to be directly addressable by means of the address in the addressed location of start point table 104.

Now referring to FIG. 2, the manner in which the H-pointers and T-pointers are linked shall now be discussed. FIG. 2 illustrates the initial condition of the search table 106 which by way of example and for ease of illustration includes only five entries A through E, wherein entry E is the most recently used entry and A is the least recently used entry. Further, FIG. 2 illustrates two families of entries wherein entries B and A are in one family, entry B being the more recently used entry of the two, and wherein entries E, D and C comprise a second family, wherein entry E is the most recently used entry in the family and entry C is the least recently used entry in the family. Accordingly, the Head pointer 118 points to entry E (the most recently used entry) and the Tail pointer 116 points to the least recently used entry, namely entry A. In a similar manner, the H-pointer of entry A points to entry B, and so on until the H-pointer of entry D points to entry E. The H-pointer of entry E does not link to any other entry and is accordingly set for example to all binary zeros. With respect to the T-pointers, the T-pointer of entry E points to entry D and so on until the T-pointer of entry B points to entry A. The T-pointer of entry A does not point to any other entry and accordingly may be for example set to all binary zeros.

The link pointers, which point only to entries in a particular family of entries, are included such that the most recently used entry in the family points to the next most recently used entry until the last entry in the family is pointed to. Accordingly, the link pointer of entry E points to entry D, and the link pointer of entry D points to entry C. The link pointer of entry C does not point to entry B and since entry C is the last entry in the family of entries, it is set to all binary zeros to indicate that it is the last entry in the family. In a similar manner, the link pointer of entry B points to entry A and the link pointer of entry A is set to all binary zeros to indicate the last entry in the family of entries.

FIG. 3 illustrates the manner in which the respective pointers link after and by way of example, entry D and accordingly the associated program thereto is hit and is therefore the most recently used. As can be seen, the Tail pointer 116 includes the address of the least recently used entry, namely entry A, and that the H-pointers of entry A and entry B remain as in FIG. 2. Because entry D is now the most recently used entry, it is now pointed to by Head pointer 118 and further its H-pointer is set to all binary zeros. Accordingly, the H-pointer of entry C now points to entry E and the H-pointer of entry E now points to entry D. Thus, it can be seen that only three entries are affected by a hit, namely the hit entry D and the preceding entry or less recently used entry C and the succeeding entry or more recently used entry E. Similarly, the T-pointers of entries, A, B and C are not affected. However, the T-pointer of entry D now points to entry E and the T-pointer of entry E points to entry C. With respect to the link pointers, the link pointer from entry B to entry A is not affected. Further the binary zeros in the link pointer field of entry C are not affected. Accordingly, now instead of the link pointer of entry E pointing to entry D, the reverse is true, that is, the link pointer of entry D now points to entry E and the link pointer of entry E points to entry C. Thus, only the link pointers of the hit entry, in this case entry D, and the now immediately preceding entry or less recently used entry, namely entry C, have their link pointers affected by a hit in table 106. It should again be noted that, if the hit was on entry E, the H- and T-pointers would not be affected and in addition the link pointers would not be affected. It should also be noted that if the hit was on entry B, the H- and T-pointers would be affected, however the link pointers would not be affected.

Now referring to FIG. 4, there is shown an illustration of the manner in which the pointers link or point after a new program has been built and after the associated entry F associated with the new program has been inserted in the table 106. Thus, assuming there is no further room in memory 108, accordingly the entry A in table 106 must be replaced by a new entry. Accordingly, entry F is inserted in place thereof for the newly built program in memory 108. In this case, entry F is now the most recently used entry and is pointed to by the Head pointer 118. It should be noted in the following discussion that the linking shown in FIG. 4 follows the initial conditions of FIG. 2 and not the conditions of FIG. 3.

The least recently used entry is now after the insertion of entry F, accordingly entry B which is pointed to by Tail pointer 116. The H-pointers are now arranged, and now referring to FIG. 2 and FIG. 4, such that the H-pointer of entry B points to entry C as was the case with FIG. 2 and in addition the entries for the H-pointers for entries C and D remain as was the case for FIG. 2. However, the H-pointer for entry E now points to entry F. In a like manner, the T-pointers for entries E, D, and C remain as in FIG. 2. The T-pointer for entry B is now set to binary zeros and the T-pointer for the newly used entry F points to entry E. With respect to the link pointers, entry B is now the only entry in the particular family since by way of example entry F is shown to be the only entry in its particular family. Accordingly, the link pointers in both entries B and F are binary zeros to indicate the last entry and accordingly the only entry in these examples for those two families of entries. The link pointers for entries E, D and C remain as was the case for FIG. 2. Thus, having shown the manner in which the pointers link to different entries, it has been seen that with respect to the H- and T-pointers, only three entries must have such pointers changed upon a hit condition or a new entry condition. With respect to the link pointers, only two entries have their link pointers changed. Specifics of the manner in which such entries and thus such pointers are updated in accordance with a hit or a new program addition are specifically shown with respect to the operational flow chart of FIG. 5 and the detailed schematic block diagram of FIG. 6.

Figure 5:
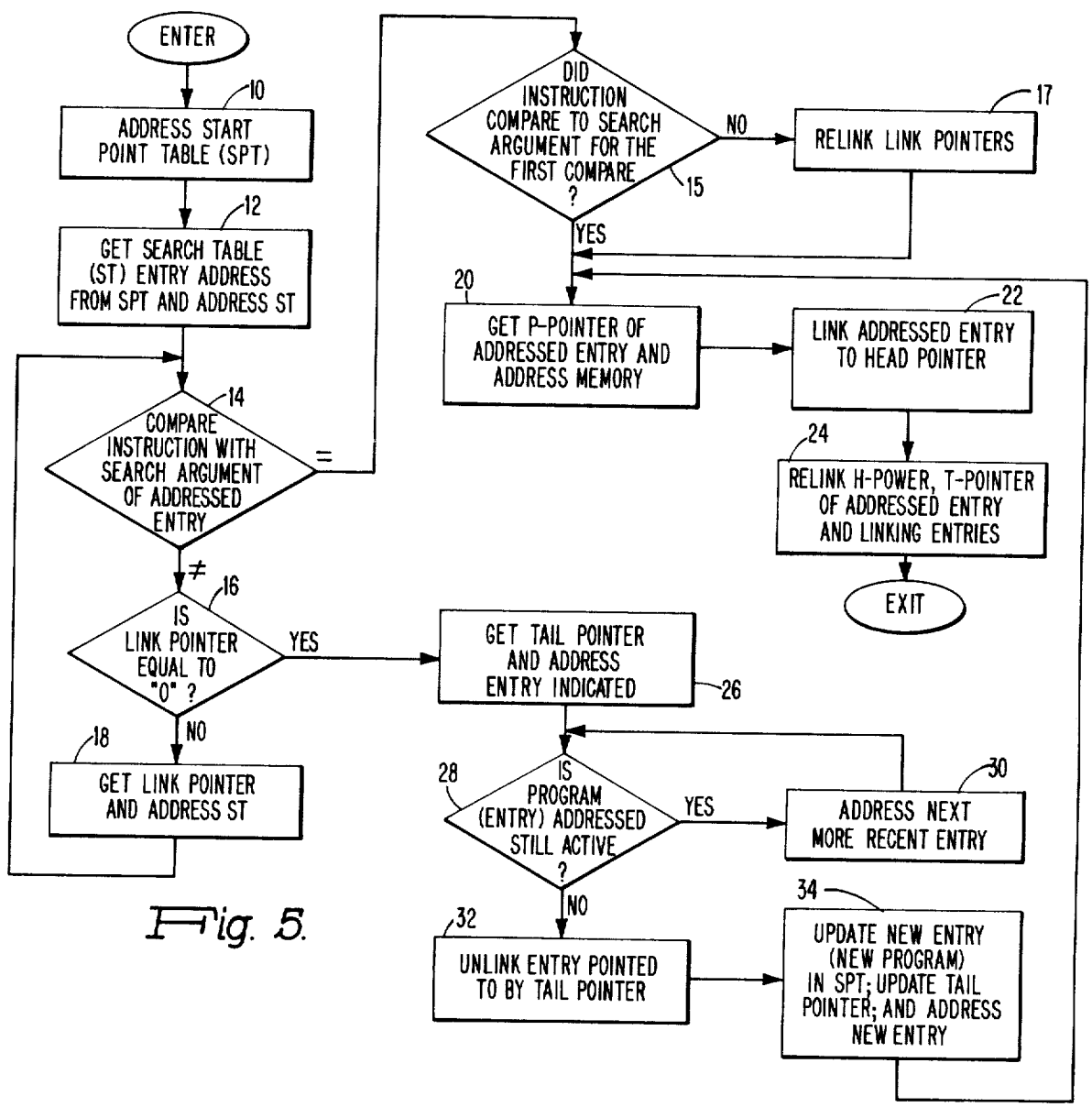
FIG. 5 is a flow diagram illustrating the operation of the present invention.

Now referring to FIG. 5, after the instruction is received by the mask, the start point table (SPT) is addressed as shown by block 10. The entry in the addressed location of the start point table is then fetched and the search table (ST) is addressed as shown by block 12. In order to determine whether there is a hit, the instruction received is compared with the search argument of the addressed entry in the search table as shown by block 14. If there is no comparison, then block 16 is entered to determine whether this is the last entry in the link. If the answer is no, then block 18 is entered in order to determine the link pointer of the entry addressed and accordingly the search table is addressed with that link pointer. This process is repeated until the answer to block 14 is an equal comparison. If there is an equal comparison, block 15 is entered to determine whether or not the equal comparison in block 14 required a loop back from block 18; that is, whether there was a comparison of the instruction with the search argument on the first or initial comparison made by block 14. If there was, then block 20 is immediately entered from block 15. If there was not, then block 17 is entered and the link pointers ar relinked after which block 20 is then entered. When block 20 is entered, the P-pointer is fetched from the addressed entry and accordingly the memory is addressed so that the program in the portion of the memory addressed may be executed. After this, as shown by blocks 22 and 24, the addressed entry is linked to the Head pointer and the H-pointer and the T-pointer of the addressed entry as well as the next more recently and next less recently used entries have their pointers updated after which the operation exits.

If block 14 did not indicate an equal comparison, and if the link pointer does equal zero, then block 16 is exited and the operation of the system goes to block 26. Actually, starting with block 26 and until block 34 exits to block 20, there is a situation where there was no comparison and accordingly there was no program and therefore no entry in th search table which corresponded to the instruction received on line 100. Accordingly, a new program must be built and therefore a new entry for that program is placed in the search table. Thus, in block 26, the Tail pointer is fetched and is used to address the entry indicated thereby. The entry indicated by the Tail pointer will be the one replaced by the new entry or program. However, before replacing such entry, the question is asked as to whether or not the program associated with that entry is still active. As indicated hereinbefore, the pointers may be changed for entries whose programs are still being used or executed and it is entirely possible, but not probable, that the least recently addressed entry, and therefore the corresponding program, may still be executing in the system. Accordingly, if this entry and therefore program is still active, block 30 is entered and the next most recently used entry is addressed. This loop continues until the answer to block 28 is no and accordingly block 32 is entered when the entry pointed to by the Tail pointer is unlinked. After this, by block 34, the new entry is placed in the start point table, the Tail pointer is updated, and the new entry is addressed. With the new program now built in memory, the block 20 is entered and such program is addressed until the operation exits after the operation of block 24.

Figure 6A:
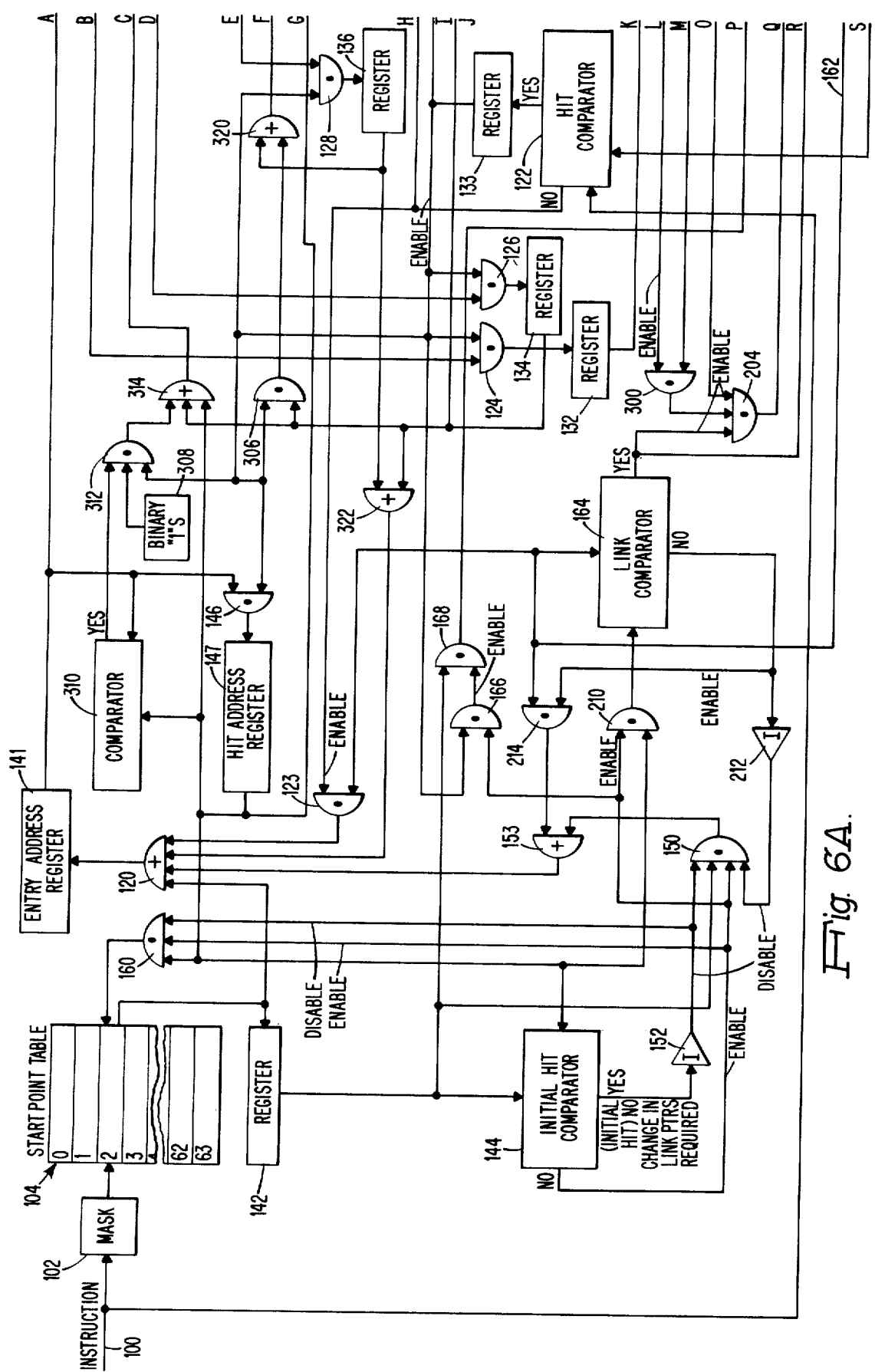
FIGS. 6A and 6B constitute a detailed schematic block diagram of the system of the present invention.
Figure 6B:
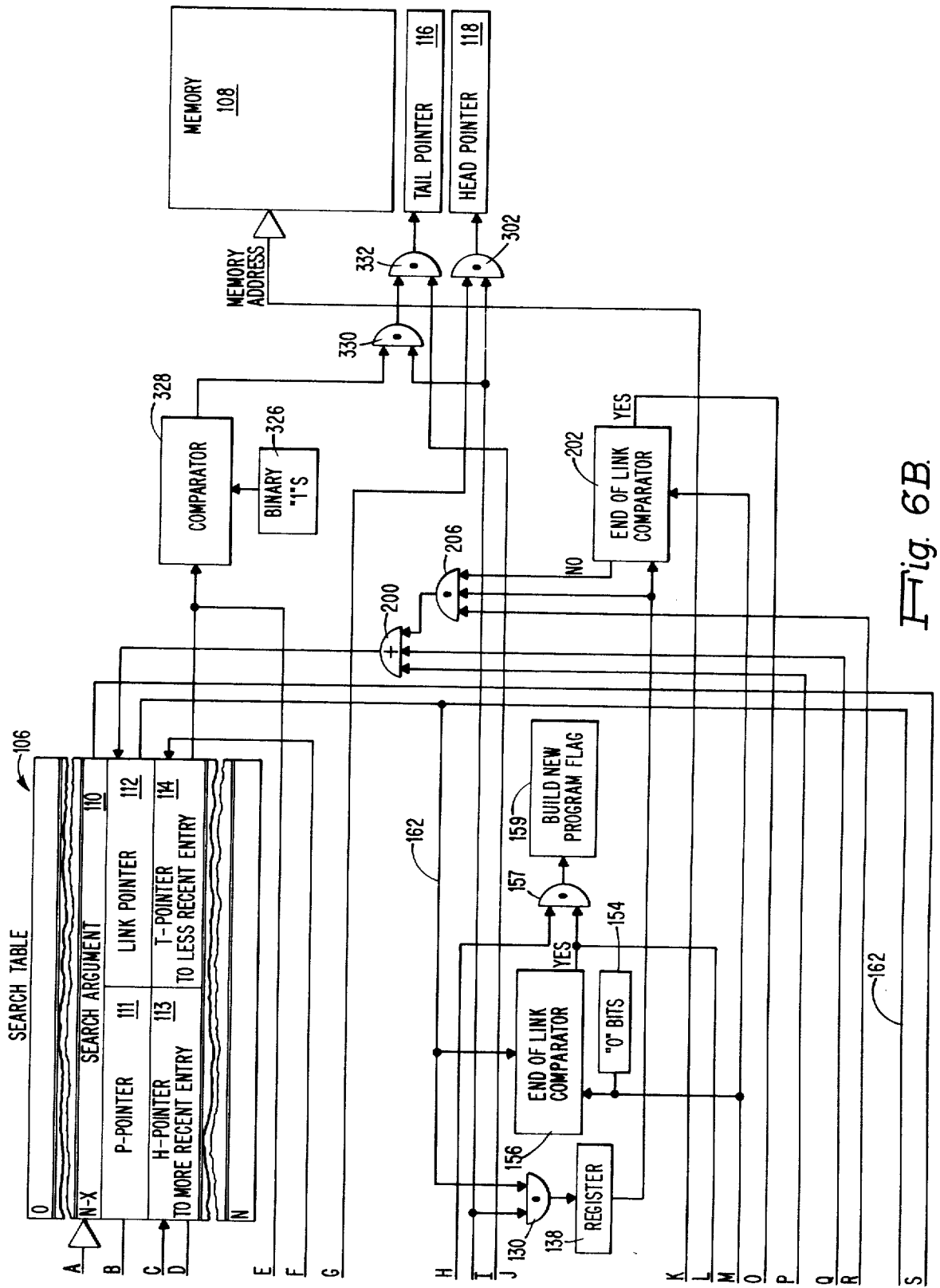

Having described the operation of the system of the present invention, the detailed configuration of the system shall be discussed with regard to the implementation shown in FIGS. 6A and 6B.

Now referring to FIGS. 6A and 6B there is shown a schematic block diagram of the system of the present invention. The instruction is received on line 100 and the significant bits thereof are received by the start point table 104 by means of mask 102. As indicated hereinbefore, instruction 100 includes a plurality of bits, such as, for example 32 bits, and the significant 6 bits are allowed to pass from mask 102 to address start point table 104. The number of locations in start point table 104 corresponds to the power of the number of bits allowed to pass via mask 102. Thus in this case six bits provided at the output of mask 102 may address up to sixty-four locations in table 104.

Table 106 includes a plurality of entries 0 through N. The number of entries in table 106 is typically greater than the number of locations in table 104. Thus, table 106 includes over 64 entries for which a typical one is shown as location N minus X. Each entry points to the starting address of a memory segment included in memory 108, wherein each segment may include a program such as for example a program as discussed hereinbefore. This is accomplished by means of P-pointer 111, which is one parameter or element of information included in each entry in table 106. As previously indicated, also included in each entry is the search argument 110, the link pointer 112, the H-pointer 113, and the T-pointer 114.

As also indicated hereinbefore, the system of the present invention upon receipt of an instruction, first locates an address of an entry in search table 106 by means of start point table 104. If the entry in table 106 which is initially addressed includes a search argument which corresponds to the instruction received on line 100, then the only further action which is required is to link the H- and T-pointers of the entry addressed in table 106 such that the just addressed entry will be at the head of the queue, thereby indicating that it was the most recently addressed and used entry, i.e., program. Further, the entries contiguous to the entry just addressed, that is the next more recent entry and the next less recent entry as pointed to by H-pointer 113 and T-pointer 114 are updated with respect to the locations to which they point. Also the Head pointer 118 is updated to point to the just addressed entry and the Tail pointer 116 is updated as required. The Head and Tail pointers may be included in memory 108 or may be included in separate registers.

If the initial entry addressed in search table 106 does not correspond to the instruction received on line 100, then subsequent entries in the same family are addressed by link pointer 112 until the search argument 110 compares with the instruction on line 100. Thus, if there is not an initial hit, that is, an initial compare between the search argument of the first addressed entry in table 106 and the instruction on line 100, then a subsequent entry for the same family is addressed. It is noted that should there not be an entry in table 106 which compares with the instruction on line 100, then it would be necessary to build a new program and place it in the last used location in memory 108 as pointed to by Tail pointer 116, provided that the program corresponding to such entry pointed to by Tail pointer 116 is not active. Otherwise, if there is a subsequent entry in table 106 which is pointed to by link pointer 112, then the link pointers in that family are rearranged or updated so that the entry which finally compares and is addressed, has its address placed in the location of start point table 104 which contained and is now updated to contain the initial address for that family. This just addressed entry has its link pointer then altered to point to the address which was just previously in the location initially addressed in start point table 104. In this manner, the most recently used or hit entry for that family has its address placed in table 104 based on the probability that it will be the next used entry, i.e. program. Accordingly, by locating the address for such just addressed entry in the start point table 104, an initial hit will probably be encountered the next time that that family of entries is addressed by means of the instruction on line 100.

Thus, the apparatus of the present invention envisions the use of an address which is comprised of the signifcant 6 bits, for example, of an instruction which may be an instruction of a processor to be emulated, and also for example of an instruction which is used for input/output operations of the system. These significant six bits address a table which provides an address in a search table of an entry corresponding to the instruction. The entry points to a segment in memory which may include the program of interest. Further in order to allocate resources in memory 108, the pointers for the respective entries in search table 106 are updated in order to indicate the more recently used entries, that is corresponding programs, so that resources, that is memory space in memory 108, may be allocated to only the more recently used programs to the extent of the capability of such memory. In addition, the pointers in the start point table to the entries of the search table, may be updated so that they may point to the entry of the more recently hit entry in the family of entries.

Thus in more detail, the instruction received on line 100 has its significant bits masked by mask 102 so as to address a location shown in FIG. 6A as location 2 in start point table 104, which then addresses, by means of an OR function depicted by OR-gate 120 and register 141, an entry in search table 106. The search argument 110 for the addressed entry is then read out and received at one input of Hit comparator 122 whose other input is the instruction received on line 100. If there is not a hit indicated by comparator 122, AND gate 123 is enabled so that the link points of the presently addressed entry is used to address another entry in table 106. If there is a hit indicated by comparator 122, then via register 133, this enables each of the AND functions as depicted by AND gates 124, 126, 128 and 130 to pass respectively the P-pointer 111 to register 132, the H-pointer 113 to register 134, the T-pointer 114 to register 136 and the link pointer 112 to register 138. The P-pointer, now in register 132, is utilized to address memory 100 by means of line 140.

Now to determine whether this was an initial hit thereby obviating the necessity to update the address in the addressed location of start point table 104, the address to the entry in search table 106 which was addressed in start point table 104, is placed in register 142, and is provided to one input of Initial Hit comparator 144. The other input to comparator 144 is received by means of register 147 and AND gate 146, which is enabled by comparator 122, from the entry address register 141. If there is an initial hit, this disables AND gate 150 by means of inverter 152 thereby inhibiting the requirement to change the link pointers 112 in the respective entries for a particular family of entries.

Before discussing the manner in which the pointers in registers 134 and 136 are utilized, the manner in which the link pointers are updated shall now presently be discussed. Basically the operation of updating the link pointer may be outlined as follows. As indicated hereinbefore, when there is an initial hit, there is no need to update the link pointers so the following discussion is based upon the absence or an initial hit. Two general situations arise, first where the entry which is hit is not the last entry in the family and second where the entry which is hit is the last entry in the family. For both such conditions, the entry which is hit must therefore have its link pointer changed to link to what was the most recently active entry in the family of entries in which the hit entry is located. Thus, the hit entry must link to the first entry or the entry whose address is contained in start point table 104. Also for both conditions, the start point table must be updated so that the entry which is hit has its address included therein.

In addition, if the hit entry is not the last entry in the family, then the entry preceding the hit entry must be linked to the entry succeeding the hit entry. That is, the entry which is nect more recently used entry before the hit must be linked to the entry which is the next less recently used entry before the hit. If the entry which is hit is the last entry in the family, then the entire preceding the entry which is hit, that is, the entry which was before the next more recently used entry, must have its link pointer set to binary zero thereby indicating that it is now the last entry in this particular family of entries.

The above is implemented by means of the apparatus shown in FIGS. 6A and 6B. More specifically, in other to update the start point table 104, the address of the entry addressed by memory table 104 continues to be in register 141 and is placed in hit address register 147 if AND gate 146 is enabled by a hit indicated by comparator 122. If this is not an initial hit as indicated by comparator 144, then AND gate 160 is enabled to write the address now in register 147 into the location addressed in start point table 104. As indicated hereinbefore, this is true only when there is not an initial hit and further such condition is true for both general and conditions, that is whether or not the entry which is hit is or is not the last entry in the family of entries.

With the just hit entry in table 106 still addressed by means of register 141, and with the original address (before the hit) of the location addressed in the start point table 104 now in register 142, and in order to link the entry which has just been hit to the entry indicated by the address in register 142, the contents or address in register 142 are allowed to pass via AND gate 168 and through OR-gate 200 to be written into the link pointer location for the entry which is presently addressed and in this case which has just been hit. The AND gate 168 is enabled by means of a hit condition indicated by hit comparator 122 and the lack of an initial hit as indicated by comparator 144. Thus, the entry which has just been hit and which as indicated hereinbefore has its address now in the location addressed in start point table 104, is now linked by means of its link pointer to the entry whose address was formerly, before the hit, in the start point table 104.

Having now updated the start point table and the link pointer in the just hit entry, it is now significant to determine whether or not the entry which has just been hit is or is not the last entry in the family of entries. Thus, upon the generation of a hit signal as provided by comparator 122, the link pointer of the hit entry which is presently in register 138 is compared by means of end of link comparator 202 with the binary zero bits 154. In addition, the link pointer on line 162 coupled with the addressed entry in table 106 is also compared with zero bits 154 by means of end of link comparator 156. Whereas comparator 156 indicates whether this is the end of the link for the entry in table 106 presently addressed, comparator 202 indicates only whether the entry which was hit is the end of link. If comparator 156 indicates that the addressed entry is the end of the link, and if there was no hit, AND gate 157 is enabled and flag 159 is set thereby indicating that a new program must be built.

If comparator 202 gives a no indication, then AND gate 206 will be enabled whereas if the link comparator 202 generates a yes output, then AND gate 204 will be enabled. However, neither AND gates 204 nor 206 are fully enabled until as shall be seen, the required entry in table 106 is addressed. This is required since it is the entry preceding the entry which has just been hit which must have its link pointer updated in order to either link to the entry succeeding the hit entry if the hit entry was not the last entry in the family or in order to have all binary zeros written therein if the hit entry was the last entry in the family.

The object is to now find and address the entry in table 106 which is the preceding or next more recently used entry to the entry which has just been hit. Accordingly, the contents of register 142 which includes the address of he entry in search table 106 which was initially addressed for that family, is enabled to pass through gate 150 and OR gate 153 to again address the table 106. Thus, the first entry in the family for the entry which was just hit, is addressed in the table 106 via gate 120 and register 141. The object now is to compare the link pointer of the entry presently addressed with the address of the entry which was hit. Although this is not necessary for the entry which had been addressed by the start point table before the hit, since in fact an initial hit would have been indicated by comparator 144, this routine is necessary for subsequent entries in the family.

Thus, the link pointer of the addressed entry in table 106 is compared by means of link comparator 164 with the address in register 147. The address in register 147 is enabled to one input of comparator 164 by the enabling of AND gate 210 when the initial hit comparator 144 gives a NO output. In this case, that is for the initial loop wherein the first entry in the family is addressed, comparator 164 will give a NO answer which when present disables gate 150 via inverter 212. A NO indication from link comparator 164 also enables AND gate 214 to pass the link pointer received at one input of comparator 164 through OR gate 153 to again address the search table 106.

This process continues until link comparator 164 generates a YES result thereby partially enabling AND gate 204. With a YES answer from link comparator 164, this means that the preceding entry or the next more recently used entry from the entry which was just hit as indicated before the hit, is presently being addressed in search table 106. It is accordingly the object now to either, in the entry now addressed place the link pointer which was formerly in the entry which was hit, or place all binary zero bits in the link pointer location for this particular entry now addressed. If this is the end of the link then both comparators 156 and 202 will generate YES indications thereby enabling AND gate 300 to pass 0 bits 154 through AND gate 204 and OR gate 200 which thereby are written into the link pointer location of the addressed entry in search table 106. If this is not the end of the link, then the link pointer which was formerly in the entry which was hit and which is now in register 138, is passed by the enabling of AND gate 206 via OR gate 200 and thus written into the respective link pointer location.

Thus, it has been shown that the link pointers have been updated if there is not an initial hit. The link pointer is updated in both the entry which has been hit and the entry hich was, before the hit, the next more recently used entry. Further, the start point table has been updated in order to point to the just hit entry. Thus, having updated the link pointers and the start point table, the H-pointer and the T-pointer as well as the Tail pointer 116 and Head pointer 118 must be updated concurrently therewith.

As indicated by FIGS. 2, 3 and 4, only the entry which has just been hit as well as the entries on either side of the hit entry in terms of recent use, may have their H-pointer and T-pointer updated. In addition, the Tail pointer 116 and the Head pointer 118 may have to be updated. The addresses thus of the hit entry and the adjacent entries in terms of time of use must accordingly be addressed. Registers 147, 134 and 136 are utilized for this purpose. Register 147 contains the address of the hit entry and may have its H and T-pointers updated at the time that the link pointer thereof is updated. Registers 134 and 136 include the addresses of the next more recently used entry and the next less recently used entry respectively and are accordingly utilized to address such entries in order to have their respective H and T-pointers updated.

Thus when a hit is indicated by comparator 122, Head pointer 118 is immediately updated with the address of the hit entry as indicated by register 147.

The address in register 147 is passed to the Head pointer 118 via the enabling of AND gate 302. Now referring to the example as set forth in FIGS. 2 and 3, if the hit entry is entry D, then its H and T-pointers will respectively point to the lack of a more recent entry and to entry B instead of to entries E and C respectively. Thus in our example, the next more recently used entry as indicated by H-pointer 114 for the hit entry will now be placed in the T-pointer 114 for the hit entry. This is accomplished by passing the contents of register 134 through enabled AND gate 306 and writing it into the T-pointer location for the just hit entry. On the other hand, the H-pointer 113 for the just hit entry has binary ONE's 308 written therein based on an equal comparison by comparator 310 of the address on line 148 and the address in register 147. This YES indication from comparator 310, as well as the hit indication from comparator 122, enables AND gate 312 which passes the binary ONE's through OR gate 314 so as to write the binary ONE's in the H-pointer location of the just hit entry.

After the operation of updating the pointers in the just hit entry, either the entry preceding or succeeding the just hit entry in terms of more or less recent use, must have their pointers updated also. Assuming that the entry which was the next more recent entry to the hit entry, is to have its pointers updated, then in that case and referring to FIG. 2 and FIG. 3, entry E will have its H-pointer and T-pointer updated. Accordingly, entry E will have its H and T-pointers respectively point to entry D and entry C wherein before the hit, such pointers respectively referred to the lack of a more recent entry and entry D.

Thus, entry E is addressed by means of the contents of register 134. This occurs on a timed and sequential basis as are the other addresses received by OR gate 120, by conventional timing means not shown. With the entry E addressed, the contents of register 136, that is by our example the address of entry C, is written into the T-pointer location for entry E on a timed and sequential basis through OR gate 320. The H-pointer field or location of entry E is updated with the address of entry D by means of the address in register 147, that is, the address of entry D, of the hit entry, by means of, and on a timed and sequential basis through OR gate 314. Thus, having updated the H-pointer and T-pointer for the next more recently used entry as it was before the hit, entry C, must now be updated in its H-pointer and/or T-pointer locations.

Entry C is addressed by means of the contents of register 136 via OR gate 322 as was the case for the operation on the contents of register 134 and on a timed basis with the other inputs of OR gate 120 and register 141. Since the T-pointer for entry C remains the same after a hit, it need not be updated. However, the H-pointer for entry C must be updated so as to instead of pointing to entry D, rather point to now, after the hit, entry E. Accordingly, the contents of register 134 containing the address of the entry E, are written into the H-pointer location for the C entry via and on a timed and sequential basis with the other inputs, through OR gate 314. Having now updated the H-pointer and the T-pointer for the three entries in search table 106 affected by a hit, the manner in which the Tail pointer is 116 is updated shall now be discussed.

The Tail pointer 116 is updated so as to point to, that is include the address of, the entry in table 106 which of all the entries in search table 106 exclusive of the family thereof, is the least used entry at any given time. The most common example of the Tail pointer 116 being updated is when the least entry is actually used. In this case, the next least used entry is updated to point to Tail pointer 116. The least used entry includes binary ONE signals in its T-pointer location 114. The detection of such state if such entry is hit indicates that the Tail pointer 116 must be updated. Thus, if the binary ONE's 326 compare with the T-pointer location code by means of comparator 328, then AND gate 330 is fully enabled if the entry which is currently addressed is also the entry which was hit. The full enabling of AND gate 330 thereby enables AND gate 332 to pass the address in register 134 for writing into Tail pointer 116. This is so because the entry which was hit and which was the least used entry before the hit, has the H-pointer address stored in register 134 based upon the hit, and which address in register 134 points to the next least used entry in table 106. Accordingly, Tail pointer 116 is updated and the entire process of updating the various pointers and the start point table are completed.

Having described the invention, what is claimed as new and novel and for which it is desired to secure Letters Patent is:

1. A data processing system comprising:
   A. a memory for storing a plurality of programs, each of said programs including a plurality of commands for executing one of a plurality of specified functions, some of said programs used in said system more frequently than others of said programs;
   B. means for receiving an instruction;
   C. a first table comprising a plurality of entries equal in number to the number of said programs, each entry associated with and capable of being used in conjunction with one of said programs, each of said entries comprising:
      1. a first pointer to the address in said memory of said associated one of said programs,
      2. a first address, wherein said first address is different for each of said entries and includes information which is comparable to one of said instructions;
      3. means for indicating the activity state of said entries in accordance with the frequency of use of said programs;
   D. means for comparing said instruction with said first address in at least one of said entries, said means for comparing including means for first comparing said instruction with said first address of the entry which corresponds to the most frequently used ones of said programs; and
   E. means, including one of said first pointers, for addressing the one of said programs whose associated entry includes a first address which compares with said instruction.

2. A system as in claim 1 further comprising means, included in said means for indicating, for further indicating the activity state of said entries in accordance with the most recently used ones of said programs.

3. A system as in claim 1 further comprising:
   A. a second table comprising a plurality of locations, each of said locations including a second address, said second address being associated with an entry in the first table;

B. means for addressing one of said locations in said second table by means of said instruction; and wherein C. said means for comparing compares said instruction with the first address in the one of said entries indicated by said second address in the addressed location of said second table.

4. A system as in claim 3 wherein the number of locations in said second table is less than the number of entries in said first table.

5. A system as in claim 3 wherein said instruction includes a plurality of bits and wherein said means for receiving includes means for selecting a group of bits of said plurality of bits in order to enable said second table addressing means, said group of bits comprising several bits which enable the differentiation of one of said instructions from all other ones of said instructions which may be received by said system.

6. A system as in claim 3 wherein each of said entries comprises means, included in said means for indicating, for indicating the activity state of said entries in accordance with the most recently used ones of said programs, a one of said entries including means for pointing to the entry (hereinafter referred to as the entry corresponding to the next most recently used one of said programs) which was used just after the said one of said entries was used, and means for pointing to the entry (hereinafter referred to as the entry corresponding to the next less recently used ones of said programs) which was used just before the said one of said entries was used, wherein said last two mentioned means for pointing respectively include a second pointer and a third pointer, said second pointer including the address of the entry corresponding to the next-most recently used one of said programs with respect to the particular entry, and said third pointer including the address of the entry corresponding to the next less recently used one of said programs with respect to the particular entry.

7. A system as in claim 6 further comprising:

A. means for storing a head pointer for indicating the address of the entry corresponding to the most recently used program of all of said programs;

B. means for storing a tail pointer for indicating the address of the entry corresponding to the least recently used program of all of said programs;

C. means for updating said second and third pointers of the entry whose first address compares with said instruction so that new more recently and less recently used entries are pointed to; and D. means for updating said second pointer and/or said third pointer of the entries indicated by the non-updated addresses in said second and third pointers of said entry whose first address compares with said instruction so that a new more recently and/or less recently used entry is pointed to.

8. A system as in claim 7 further comprising means for updating said head pointer by replacing the non-updated address therein with the address of said entry whose first address compares with said instruction.

9. A system as in claim 8 further comprising means for updating said tail pointer by replacing the non-updated address therein with the address of the least recently used program of all of said programs.

10. A system as in claim 9 further comprising:

A. means for indicating that there is no comparison between said instruction and the first address of any of said entries in said first table thereby indicating that a program corresponding to said instruction is not presently stored in said memory; and B. means for enabling the replacement of the program in said memory corresponding to the entry indicated by said tail pointer with another program.

11. A system as in claim 6 further comprising at least one family of entries including at least two entries, each of which may have its first address compared with said instruction, wherein each of said entries further comprises a fourth pointer, said fourth pointer including an address for linking one entry to another entry in the same family of entries, wherein said second table includes the address of the most recently used one of said at least two entries and wherein said fourth pointer of said most recently used one of said at least two entries includes the address of the other one of said at least two entries.

12. A system as in claim 11 further comprising means for updating the address in one of said locations in said second table to point to the entry corresponding to the most recently used program of the programs corresponding to the entries in said family of entries.

13. A data processing system having the capability of executing instruction sets of alternative systems comprising a memory storing a plurality of programs, each program comprising a set of instructions or commands by means of which the present system is able to execute the corresponding instructions of the alternative system, memory addressing means, a first table of entries, and first table addressing means; characterised in that the table is so arranged that the entries therein have a first portion containing a first pointer to the address in the memory at which a respective one of said programs is stored, a second portion containing an identifying address for comparison with the instruction which is to be carried out and a third portion for providing an indication of the activity state of the said entry in respect of the said other entries in the table, in that there is means provided for selecting as the first entry in said table to be addressed the entry which corresponds to the most frequently used one of said programs, and in that there is provided first comparison means connected to said table for comparing the received instruction with the identifying address contained in the said second portion of the addressed entry in the table and means for transferring to the said memory addressing means the address in the first said portion of the respective entry in the table in the event of a favourable comparision between the address contained in the second portion of the addressed entry and the received instruction.

14. A data processing system according to claim 13 characterised in that the said third portion of each entry in the said table incorporates an indicator of the activity state of the respective entry in relation to the most currently used entry.

15. A data processing system according to claim 14 characterised in that the said third portion of an entry in respect of each entry in the said first table comprises a first section containing a second pointer which points to the entry in the first table which was used immediately after the respective entry containing the second pointer was used and a second section containing a third pointer which points to an entry in the first table which was used just before the said respective entry was used.

16. A data processing system according to claim 15 characterised in that said third portion of an entry in respect of each entry in the said first table comprises a third section containing a fourth pointer which is a link pointer to another entry in the said first table.

17. A data processing system according to claim 16 characterised in that the said means for selecting an entry in the said first table comprises a second table having a plurality of entries, each of said entries comprising an address of a respective entry in said first table, means for addressing locations in the said second table, second comparison means for comparing the contents of the addressed location in said second table with the received instruction, and an address register which stores the said contents and uses same for addressing the first table if the results of the comparision are favourable.

18. A data processing system according to claim 17 characterised in that said means for addressing the second table comprises a mask which selects a group of bits from the received instruction for the purposes of addressing the said second table.

19. A data processing system according to claim 17 characterised in that the first table addressing means is arranged so as to address the entry in the said first table indicated by said fourth pointer in the event that the said comparison is unfavourable.

20. A data processing system according to claim 19 characterised in that it contains means for updating the second and third pointers of the entry in the said first table which on the first address of the first table compares with the said received instruction so that new more recently and less recently used entries are pointed to, and for updating either or both of the second and third pointers of the entries indicated by the non-updated addresses of the said second and third pointers of the entry whose first address compares with said instruction so that, as the case may be, a new more recently and/or less recently used entry is pointed to.

21. A data processing system according to claim 15 characterised in that it includes a pair of registers one of which registers stores a head pointer which is a pointer to the entry in the said first register corresponding to the most recently used program of all the programs stored in said memory and the other of which registers stores a tail pointer which is a pointer to the entry in the first table of the least recently used program of all of the programs stored in the said memory.

22. A data processing system according to claim 21 characterised in that it comprises means for updating the head and tail pointers by replacing the non-updated addresses therein respectively with the address of the entry in the first table whose first address compares with the received instruction and with the address of the least recently used program of all the said programs stored in the memory.

23. A data processing system according to claim 22 characterised in that it comprises means for replacing in the memory the program corresponding to the entry in the first table indicated by said tail pointer with another program.

* * * * *